US012759162B2

(12) United States Patent
Hashizaki et al.

(10) Patent No.: US 12,759,162 B2
(45) Date of Patent: Oct. 13, 2026

(54) SUBSTRATE-CONVEYING ROBOT SYSTEM AND SUBSTRATE-CONVEYING ROBOT

(71) Applicant: KAWASAKI JUKOGYO KABUSHIKI KAISHA, Kobe (JP)

(72) Inventors: Satoshi Hashizaki, Kobe (JP); Shinya Kitano, Kobe (JP); Ryousuke Kanamaru, Kobe (JP); Katsuhiro Yamashita, Kobe (JP); Tomoya Nagasawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 52 days.

(21) Appl. No.: 18/859,458

(22) PCT Filed: Apr. 17, 2023

(86) PCT No.: PCT/JP2023/015356
§ 371 (c)(1),
(2) Date: Oct. 23, 2024

(87) PCT Pub. No.: WO2023/210429
PCT Pub. Date: Nov. 2, 2023

(65) Prior Publication Data

US 2026/0014706 A1 Jan. 15, 2026

(30) Foreign Application Priority Data

Apr. 26, 2022 (JP) ................................ 2022-072399

(51) Int. Cl.
*B25J 9/16* (2006.01)
*B25J 9/04* (2006.01)
*B25J 11/00* (2006.01)

(52) U.S. Cl.
CPC ............ *B25J 9/1697* (2013.01); *B25J 9/042* (2013.01); *B25J 11/0095* (2013.01)

(58) Field of Classification Search
CPC . B25J 9/1697; B25J 9/042; B25J 9/046; B25J 9/163; B25J 9/1664; B25J 9/1679; B25J 9/1682; B25J 11/0095; B25J 9/04; B25J 13/08; B25J 15/0014; B25J 19/02; H10P 72/30; H10P 72/50; H10P 72/0606; H10P 72/3402; H10P 72/3411; H10P 72/53; H10P 72/7602
See application file for complete search history.

(56) References Cited

U.S. PATENT DOCUMENTS 8,744,624 B1 * 6/2014 Kaveh ..................... H10P 72/53
356/237.1
2014/0003890 A1 1/2014 Goto
2014/0081457 A1 3/2014 Kobayashi
(Continued)

FOREIGN PATENT DOCUMENTS

JP 2009-088184 A 4/2009
JP 2011-134820 A 7/2011
(Continued)

*Primary Examiner* — Ryan Rink
(74) *Attorney, Agent, or Firm* — Oliff PLC

(57) ABSTRACT

A substrate-conveying robot system includes the controller for acquiring positional information on a notch or an orientation flat in a substrate based on an image captured by an image capturer from a lower side with respect to a substrate-handling hand in conveyance of the substrate.

10 Claims, 8 Drawing Sheets

(56) References Cited

U.S. PATENT DOCUMENTS

| | | | |
|---|---|---|---|
| 2015/0045950 A1 | 2/2015 | Kobayashi | |
| 2018/0068881 A1 | 3/2018 | Cavins et al. | |
| 2020/0027765 A1 | 1/2020 | Goto et al. | |
| 2020/0083073 A1 | 3/2020 | Yoshida et al. | |
| 2021/0013084 A1* | 1/2021 | Schaller | H10P 72/3306 |
| 2022/0241968 A1 | 8/2022 | Yoshida et al. | |

FOREIGN PATENT DOCUMENTS

| | | | |
|---|---|---|---|
| JP | 2012-138404 | A | 7/2012 |
| JP | 2014-060324 | A | 4/2014 |
| JP | 2015-037098 | A | 2/2015 |
| JP | 2017-224661 | A | 12/2017 |
| JP | 2018-056256 | A | 4/2018 |
| JP | 2019-530225 | A | 10/2019 |
| JP | 2021-009871 | A | 1/2021 |
| JP | WO2020/054387 | A1 | 8/2021 |

* cited by examiner

SUBSTRATE-CONVEYING ROBOT SYSTEM AND SUBSTRATE-CONVEYING ROBOT

TECHNICAL FIELD

The present disclosure relates to a substrate-conveying robot system and a substrate-conveying robot, and in particular to a substrate-conveying robot system and a substrate-conveying robot including a substrate-handling hand.

BACKGROUND ART

Conveyor systems including holders for holding substrates are known in the art. See Japanese Patent Laid-Open Publication No. JP 2015-037098, for example.

Japanese Patent Laid-Open Publication No. JP 2015-037098 discloses a conveyor system including a holder for holding substrate, such as a substrate for a liquid crystal FPD (Flat Panel Display), and conveying the substrate held by the holder. In the conveyor system described in Japanese Patent Laid-Open Publication No. JP 2015-037098, a camera arranged above the holder captures an image of the substrate held by the holder. Subsequently, it is determined whether the substrate held by the holder is chipped based on the image captured by the camera.

PRIOR ART

Patent Document

Patent Document 1: Japanese Patent Laid-Open Publication No. JP 2015-037098

SUMMARY OF THE INVENTION

Here, although not stated in Japanese Patent Laid-Open Publication No. JP 2015-037098, in a conveyor system in which a substrate such as a semiconductor wafer is conveyed by a substrate-conveying robot, positional information on a notch or an orientation flat is required for processing the substrate in a processor to which the substrate is to be conveyed in some cases. It is conceivable, as a method for acquiring the positional information on the notch or the orientation flat, that the positional information on the notch or the orientation flat is acquired by detecting the notch or the orientation flat in the substrate placed on an aligner, which is arranged on a way of conveying the substrate by using a substrate-conveying robot. However, in the case in which the positional information on the notch or the orientation flat is acquired by placing the substrate on the aligner, conveying the substrate is stopped for the detection by the aligner on the way of conveying the substrate, and as a result time for conveying the substrate increases. For this reason, a substrate-conveying robot system and a substrate-conveying robot capable of acquiring positional information on the notch or the orientation flat in the substrate while reducing such an increase of time for conveying the substrate are desired.

The present disclosure is intended to solve the above problem, and one object of the present disclosure is to provide a substrate-conveying robot system and a substrate-conveying robot capable of acquiring positional information on a notch or an orientation flat in a substrate while reducing an increase of time for conveying the substrate.

A substrate-conveying robot system according to a first aspect of the present disclosure includes a substrate-handling hand for conveying a substrate; an image capturer arranged on a lower side with respect to the substrate-handling hand; and a controller, wherein the controller acquires positional information on a notch or an orientation flat in the substrate conveyed by the substrate-handling hand based on an image captured by the image capturer from a lower side in conveyance of the substrate.

A substrate-conveying robot according to a second aspect of the present disclosure includes a substrate-handling hand for conveying a substrate; an image capturer arranged on a lower side with respect to the substrate-handling hand; and a controller, wherein the controller acquires positional information on a notch or an orientation flat in the substrate conveyed by the substrate-handling hand based on an image captured by the image capturer from a lower side in conveyance of the substrate.

The substrate-conveying robot system according to the first aspect of the present disclosure and the substrate-conveying robot according to the second aspect of the present disclosure include the image capturer, and the controller for acquiring the positional information on the notch or the orientation flat in the substrate, as described above. The controller acquires the positional information on the notch or the orientation flat in the substrate conveyed by the substrate-handling hand based on the image captured by the image capturer from the lower side with respect to the substrate-handling hand in conveyance of the substrate. Accordingly, the positional information on the notch or the orientation flat in the substrate can be acquired without stopping conveyance of the substrate dissimilar to a case in which the positional information is detected by an aligner on a way of conveying the substrate. As a result, the positional information on the notch or the orientation flat in the substrate can be acquired while reducing an increase of time for conveying the substrate.

According to the present disclosure, it is possible to acquire positional information on a notch or an orientation flat in a substrate while reducing an increase of time for conveying the substrate.

MODES FOR CARRYING OUT THE INVENTION

The following description will describe one embodiment embodying the present disclosure with reference to the drawings.

First Embodiment

The following description describes a configuration of a substrate-conveying robot system 100 according to a first embodiment with reference to FIGS. 1 to 8.

Figure 1:
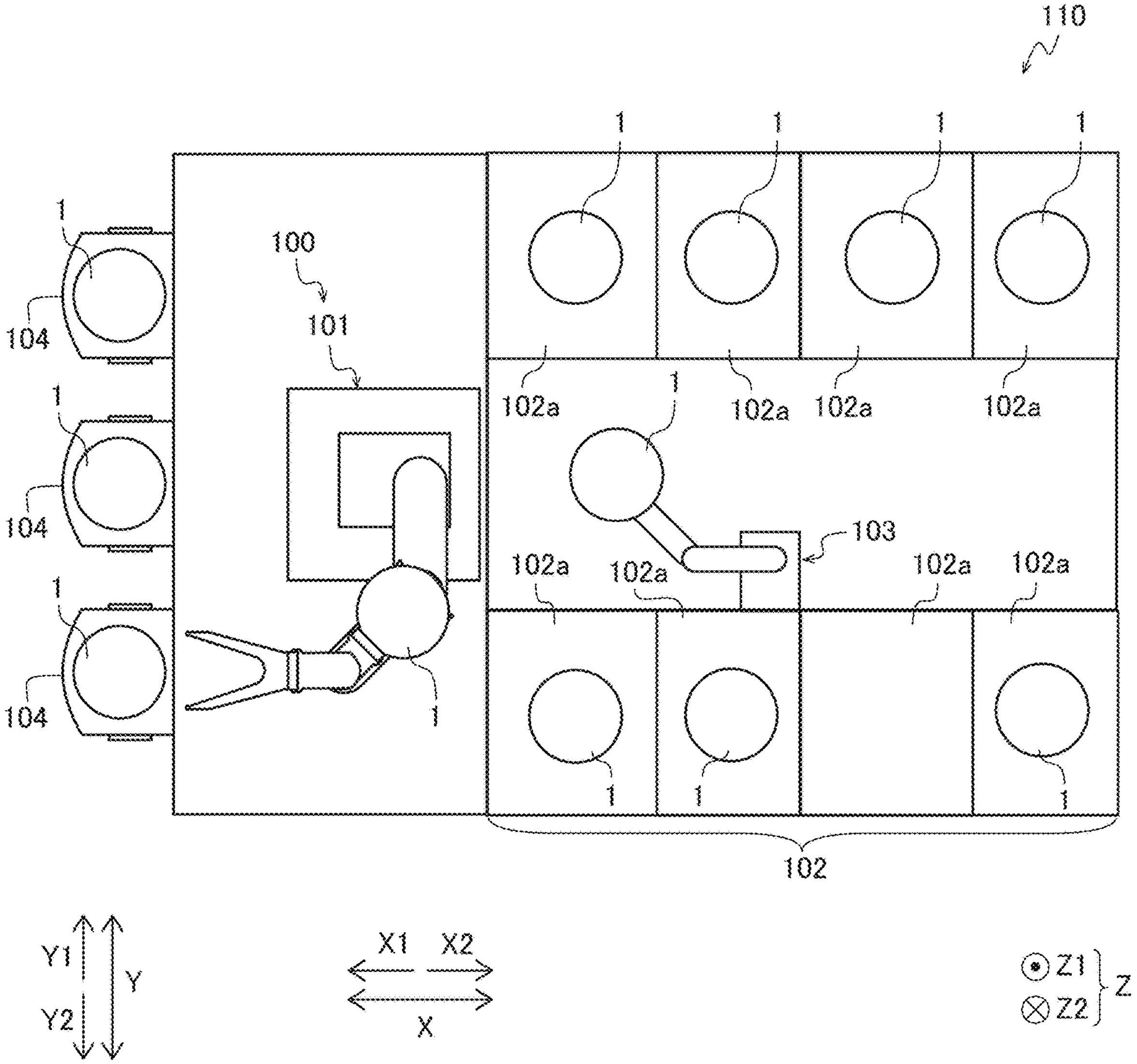
FIG. 1 is a diagram showing an entire configuration of a substrate-conveying robot system and a semiconductor production apparatus according to a first embodiment.

The substrate-conveying robot system 100 includes a substrate-conveying robot 101, as shown in FIG. 1. The substrate-conveying robot 101 is a robot for conveying substrates 1 in a semiconductor production apparatus 110. The semiconductor production apparatus 110 includes a substrate processor 102, an in-processor conveyor robot 103, substrate storages 104, and a production-apparatus controller 105.

The substrate-conveying robot 101 conveys, from the substrate storages 104 storing a plurality of substrates 1, the substrates 1. Also, the substrate-conveying robot 101 conveys the substrates 1 into the substrate storages 104. Each substrate storage 104 includes, for example, a FOUP (Front Opening Unify Pod). The substrates 1 are, for example, silicon wafers, SiC wafers, compound semiconductor wafers, or sapphire wafers.

The substrates 1 are conveyed to the substrate processor 102 by the substrate-conveying robot 101. The substrates 1 conveyed to the substrate processor 102 are conveyed by the in-processor conveyor robot 103 arranged inside the substrate processor 102. The substrate processor 102 includes a plurality of chambers 102*a* for applying chemical or physical processing to the substrates 1. An interior of the substrate processor 102 is kept in a vacuum. The in-processor conveyor robot 103 is a robot that can operate in such a vacuum environment. The substrates 1 conveyed to the substrate processor 102 are conveyed to chambers 102*a* by the in-processor conveyor robot 103. The production-apparatus controller 105 controls the entire semiconductor production apparatus 110 including control of processing applied to the substrates 1 by the substrate processor 102. The production-apparatus controller 105 is a computer including a CPU (Central Processing Unit), a RAM (Random Access Memory), a ROM (Read Only Memory), and the like.

In this specification, a direction in which the substrate-conveying robot 101 and the substrate storage 104 are arranged adjacent to each other is defined as an X direction. A direction in which the substrate storage 104 is positioned relative to the substrate-conveying robot 101 is defined as an X1 direction, and a direction in which the substrate processor 102 is positioned relative to the substrate-conveying robot 101 is defined as an X2 direction. Also, an upward/downward direction is defined as a Z direction, and upward and downward directions are defined as Z1 and Z2 directions, respectively. Also, a direction perpendicular an XZ plane is defined as a Y direction, and one direction in the Y direction is defined as a Y1 direction while another direction in the Y direction is defined as a Y2 direction.

Figure 2:
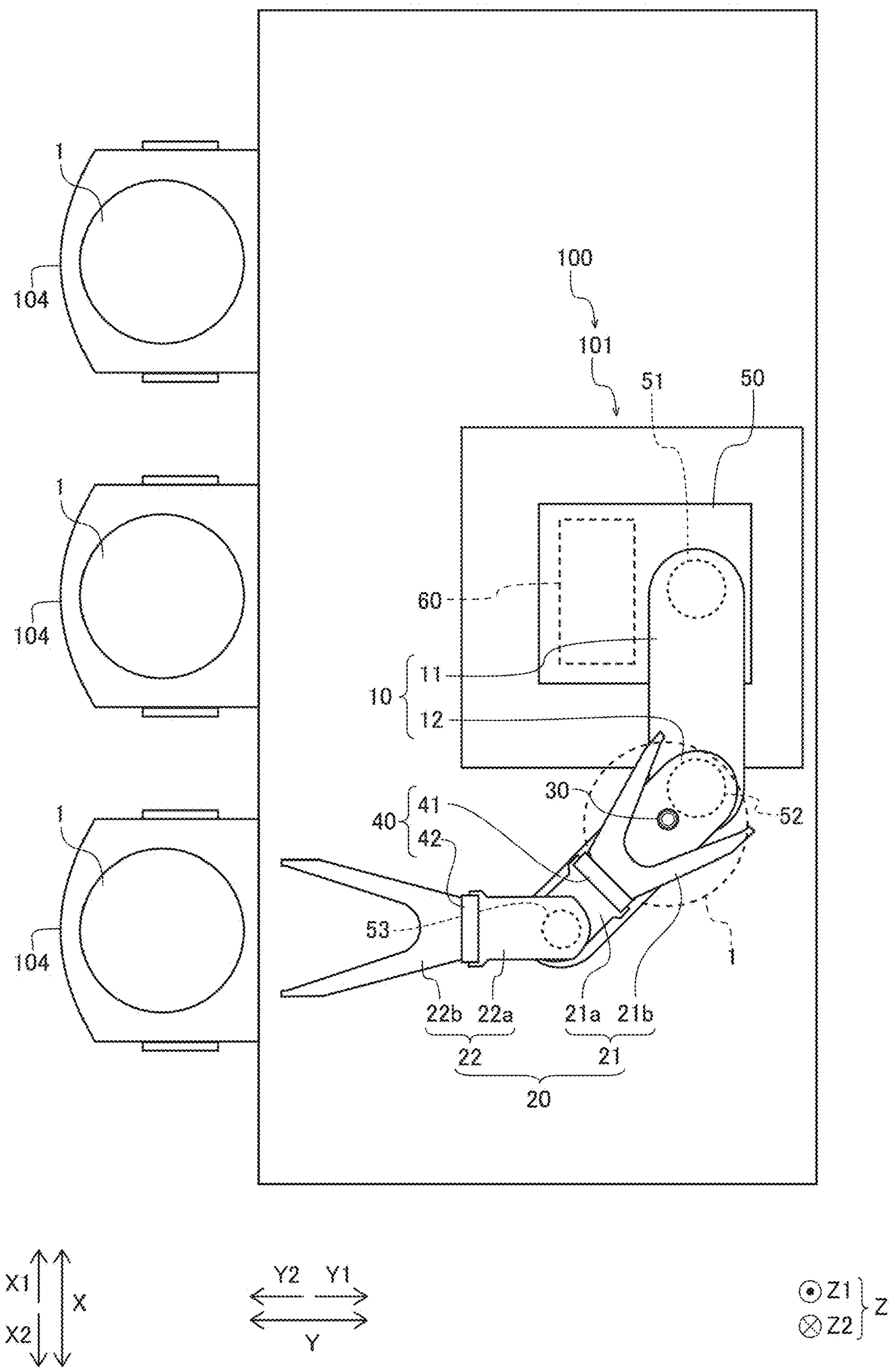
FIG. 2 is a diagram showing a substrate-conveying robot according to the first embodiment as viewed from an upper side.

As shown in FIG. 2, the substrate-conveying robot 101 of the substrate-conveying robot system 100 includes a horizontal multi-joint robot arm 10, and a substrate-handling hand 20 for conveying the substrates 1, an image capturer 30, and a sensor 40, a base 50, and a controller 60. The substrate-handling hand 20 is attached to the horizontal multi-joint robot arm 10. The horizontal multi-joint robot arm 10 includes a first arm 11, and a second arm 12 connected to the first arm 11.

The image capturer 30 is attached to the second arm 12. The image capturer 30 includes a two-dimensional camera including an image sensor, such as a CCD (Charge Coupled Device) image sensor or CMOS (Complementary Metal Oxide Semiconductor) image sensor, and a wide-angle lens, for example. The image capturer 30 may include a 3-D camera.

The substrate-handling hand 20 includes a lower hand 21 arranged on an upper side with respect to the second arm 12, and an upper hand 22 arranged on an upper side with respect to the lower hand 21. The lower hand 21 and the upper hand 22 are attached to the second arm 12 of the horizontal multi-joint robot arm 10. The lower hand 21 is an example of a first hand. The upper hand 22 is an example of a second hand.

The base 50 is attached to the horizontal multi-joint robot arm 10. Specifically, one end of the first arm 11 is connected to the base 50 through a first joint 51. Also, one end of the second arm 12 is connected to another end of the first arm 11 through a second joint 52. The substrate-handling hand 20 is connected to another end of the second arm 12 through a third joint 53. The image capturer 30 is arranged in proximity to the third joint 53 of the second arm 12. Servomotors, which are rotational driving sources, and rotational position sensors for detecting rotational positions of output shafts of the servomotors are arranged in the joints of the first joint 51, the second joint 52 and the third joint 53. The substrate-conveying robot 101 includes an upward/downward moving shaft for moving the horizontal multi-joint robot arm 10 upward/downward in the Z direction. The servomotor and a rotational position sensor for detecting a rotation angle of the servomotor are arranged in the upward/downward moving shaft.

The substrate-handling hand 20 including the lower hand 21 and the upper hand 22 is connected to the another end of the second arm 12 through the third joint 53. The lower hand 21 includes a hand base 21*a*, and a blade 21*b* attached to the hand base 21*a*. The upper hand 22 has a hand base 22*a*, and a blade 22*b* attached to the hand base 22*a*. The blades 21*b* and 22*b* are thin plate-shaped supports for supporting the substrates 1. The blades 21*b* and 22*b* have bifurcated distal ends. The blades 21*b* and 22*b* support outer edges of back surfaces of the roughly circular substrates 1 on a lower side. The substrate-conveying robot 101 conveys the substrates 1 stored in the substrate storages 104 by using the lower hand 21 and upper hand 22 of the substrate-handling hand 20 based on previously taught conveyance paths.

In the substrate-handling hand 20, the first embodiment, when one of the lower hand 21 and the upper hand 22 enters the substrate storage 104, which stores the substrates 1, in conveyance of the substrates 1, another of the lower hand 21 and the upper hand 22 that is holding the substrate 1 is moved to an avoidance position that is positioned on the upper side with respect to the second arm 12 and overlaps the second arm. Specifically, as shown in FIG. 2, in the substrate-handling hand 20, when the upper hand 22 enters the substrate storage 104 in the conveyance of the substrate 1, the lower hand 21 that is holding the substrate 1 is moved to the avoidance position, which is positioned on the upper side with respect to the second arm 12 and overlaps the second arm. Also, in the substrate-conveying robot 101, to prevent interference between the lower hand 21 and the substrate 1 that is conveyed by the lower hand 21, and the upper hand 22 and the substrate 1 that is conveyed by the upper hand 22 in the conveyance of the substrates 1, the upper hand 22 that is supporting the substrate 1 is moved to the avoidance position, which is positioned on the upper side with respect to the second arm 12 and overlaps the second arm in the conveyance of the substrates 1.

In the substrate-conveying robot system 100, an image of the substrate 1 conveyed by the substrate-handling hand 20 is captured at a position that overlaps the conveyance path of the substrate 1 conveyed by the substrate-handling hand 20 as viewed from the upper side by the image capturer 30 from the lower side with respect to the substrate-handling hand 20.

The sensor 40 includes a laser sensor 41 attached to the lower hand 21, and a laser sensor 42 attached to the upper hand 22. The laser sensors 41 and 42 are attached to proximal sides of the blades 21*b* and 22*b*, respectively. The laser sensors 41 and 42 include, for example, laser line sensors.

Figure 3:
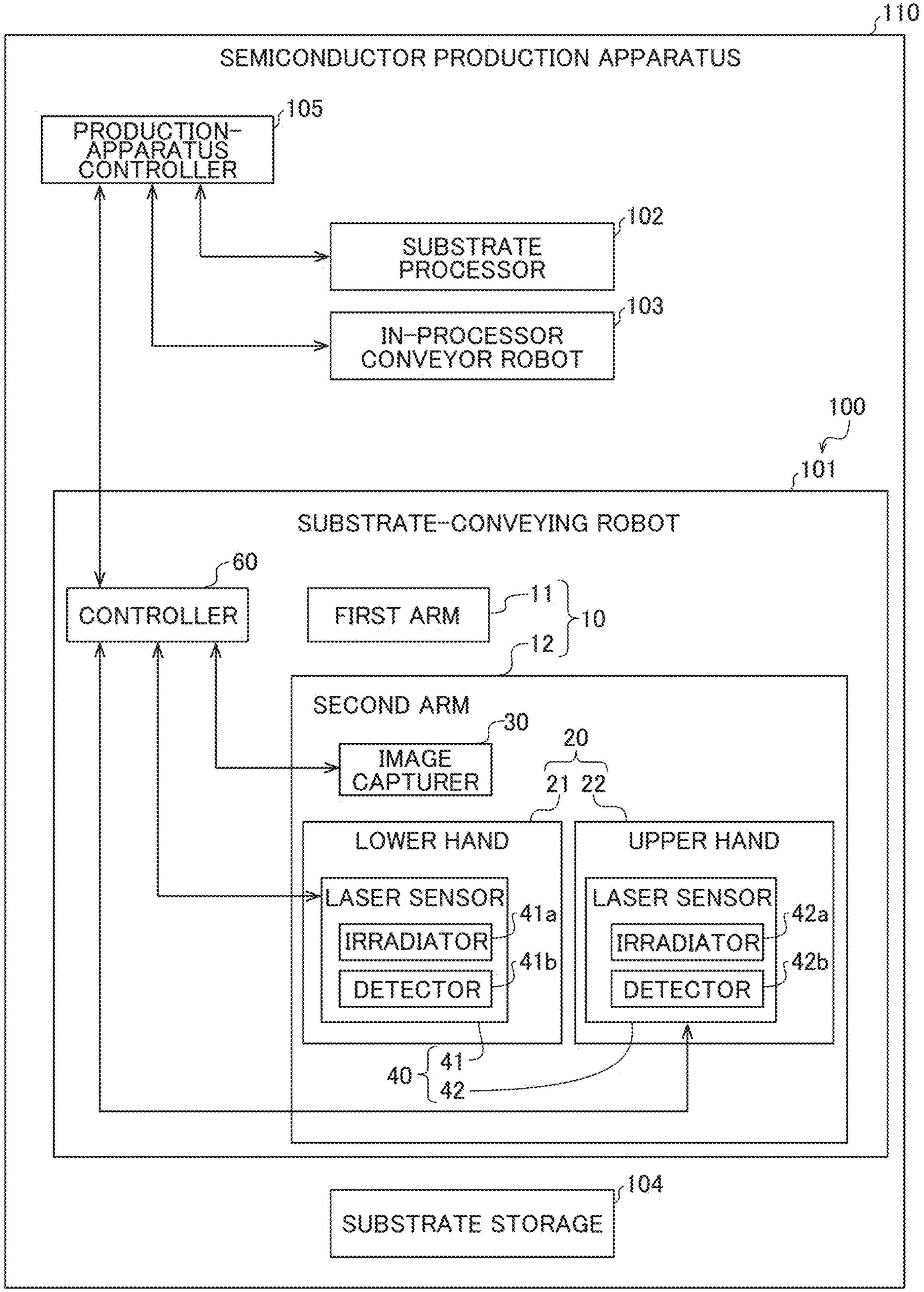
FIG. 3 is a block diagram showing the semiconductor production apparatus according to the first embodiment.

As shown in FIG. 3, the laser sensor 41 includes an irradiator 41*a* for irradiating the substrate with laser light, and a detector 41*b* for detecting the laser light with which the substrate is irradiated by the irradiator 41*a*. Also, the laser sensor 42 includes an irradiator 42*a* for irradiating the substrate with laser light, and a detector 42*b* for detecting the laser light with which the substrate is irradiated by the irradiator 42*a*.

In the first embodiment, the controller 60 controls operations of the substrate-conveying robot 101. The controller 60 is, for example, a computer including a CPU, ROM, and the like. The controller 60 includes a storage device that includes a flash memory, such as an SSD (Solid State Drive). The controller 60 controls the operations of the parts of the substrate-conveying robot 101 based on programs and parameters previously stored in the storage device.

The controller 60 acquires positional information on a notch N in the substrate 1 conveyed by the substrate-handling hand 20 based on the image captured by the image capturer 30 from the lower side in conveyance of the substrate 1. As shown in FIG. 2, the controller 60 acquires positional information on the notch N in the substrate 1 conveyed by the substrate-handling hand 20 based on the image of the substrate 1 that is captured from the lower side when the substrate-handling hand is moved to the avoidance position in the conveyance of the substrate 1. In the first embodiment, the controller 60 acquires positional information on the notch N in the substrate 1 conveyed by the substrate-handling hand 20 based on the image captured by the image capturer 30 from the lower side in the conveyance of the substrate 1 and a detection result detected by the sensor 40 in the conveyance of the substrate 1.

In the first embodiment, the controller 60 outputs the acquired positional information on the notch N in the substrate 1 to the production-apparatus controller 105, which controls the substrate processor 102 to which the substrate 1 is conveyed, as shown in FIG. 3. The substrate processor 102 is an example of a conveyance destination apparatus. The production-apparatus controller 105 is an example of a control apparatus.

In the first embodiment, the controller 60 controls capture of the image of the substrate 1 conveyed by the substrate-handling hand 20 from the lower side by using the image capturer 30 in the conveyance of the substrate 1 by using the substrate-handling hand 20 in addition to acquisition of the positional information on the notch N in the substrate 1. Specifically, as shown in FIG. 2, the controller 60 captures the image of the substrate 1 by using the image capturer 30 when the blade 21*b* that is supporting the substrate 1 is moved by turning the lower hand 21 back to face a distal end of the blade 21*b* toward a side in which the second joint 52 is arranged. Also, similar to the lower hand 21, the controller 60 captures the image of the substrate 1 by using the image capturer 30 when the blade 22*b* that is supporting the substrate 1 is moved by turning the upper hand 22 back to face a distal end of the blade 22*b* toward the side in which the second joint 52 is arranged.

Figure 4:
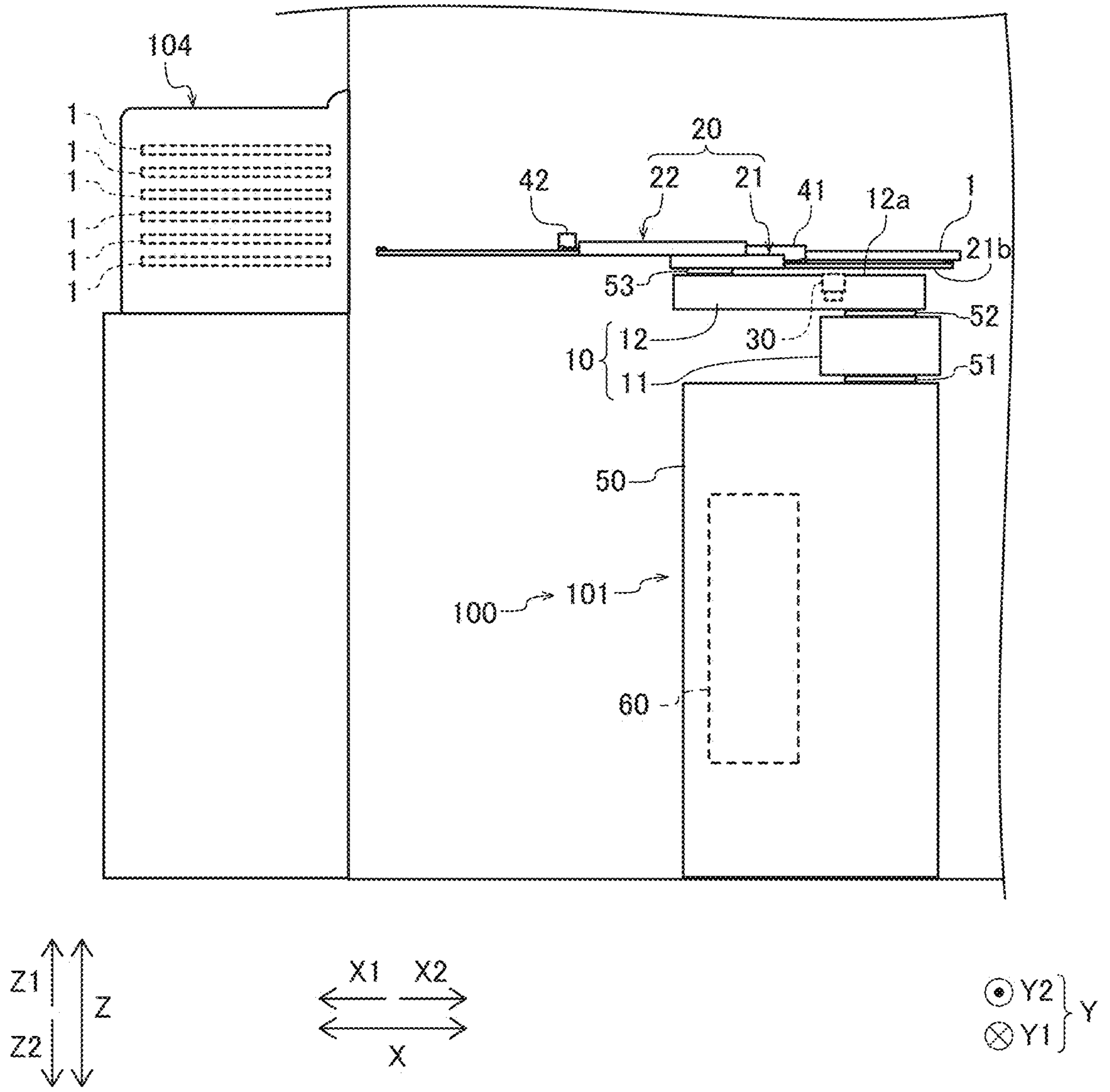
FIG. 4 is a side view showing the configuration of the substrate-conveying robot according to the first embodiment.

As shown in FIG. 4, the substrate storage 104 stores the plurality of substrates 1. The plurality of substrates 1 are arranged in the upward/downward direction inside each substrate storage 104. The plurality of substrates 1 are spaced at a predetermined interval away from each other.

The horizontal multi-joint robot arm 10 is arranged on the lower side with respect to the substrate-handling hand 20 for conveying the substrates 1 from the substrate storages 104. The base 50 is arranged on the lower side with respect to the horizontal multi-joint robot arm 10. The second arm 12 is arranged on the upper side with respect to the first arm 11. In the substrate-conveying robot 101, the upper hand 22, the lower hand 21, the second arm 12, the first arm 11, and the base 50 are arranged in this order from a Z1-direction side.

Also, the image capturer 30 is arranged on the lower side with respect to the substrate-handling hand 20, which includes the lower hand 21 and the upper hand 22. In the first embodiment, the image capturer 30 is provided to the horizontal multi-joint robot arm 10. Specifically, the image capturer 30 is arranged in an upper surface 12*a* of the second arm 12. The image capturer 30 is embedded in the second arm 12 to capture the image of the substrate 1 from a Z2-direction side. In other words, the image of the substrate 1 is captured from the lower side by the image capturer 30 embedded in the second arm 12.

(Acquisition of Positional Information on Notch in Substrate)

Figure 5:
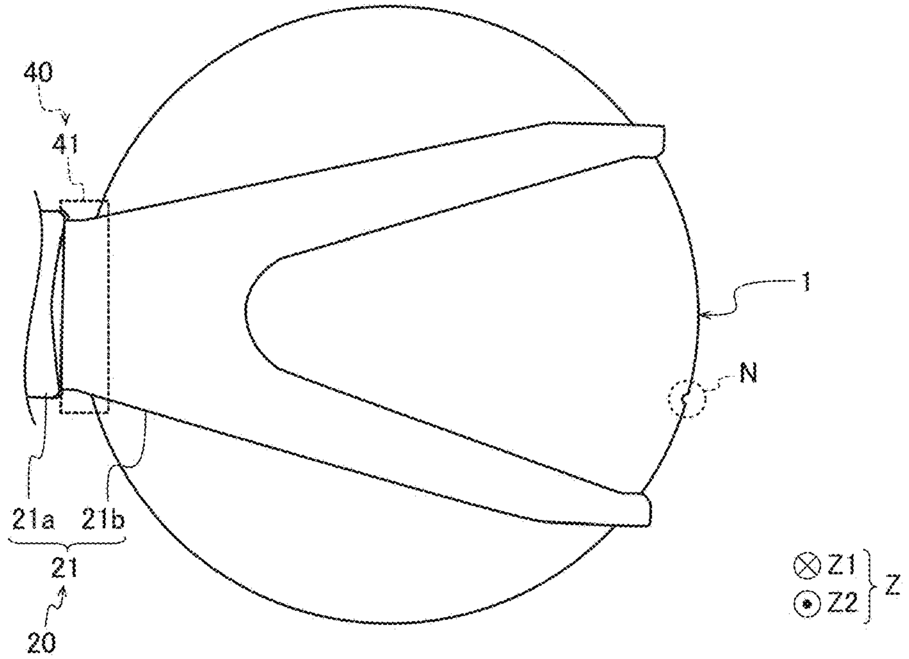
FIG. 5 is a view showing a lower hand according to the first embodiment as viewed from a lower side.

As shown in FIG. 5, the controller 60 acquires positional information on the notch N in the substrate 1 conveyed based on the image of the substrate 1 captured by the image capturer 30 from the lower side and a detection result detected by the sensor 40.

Figure 6:
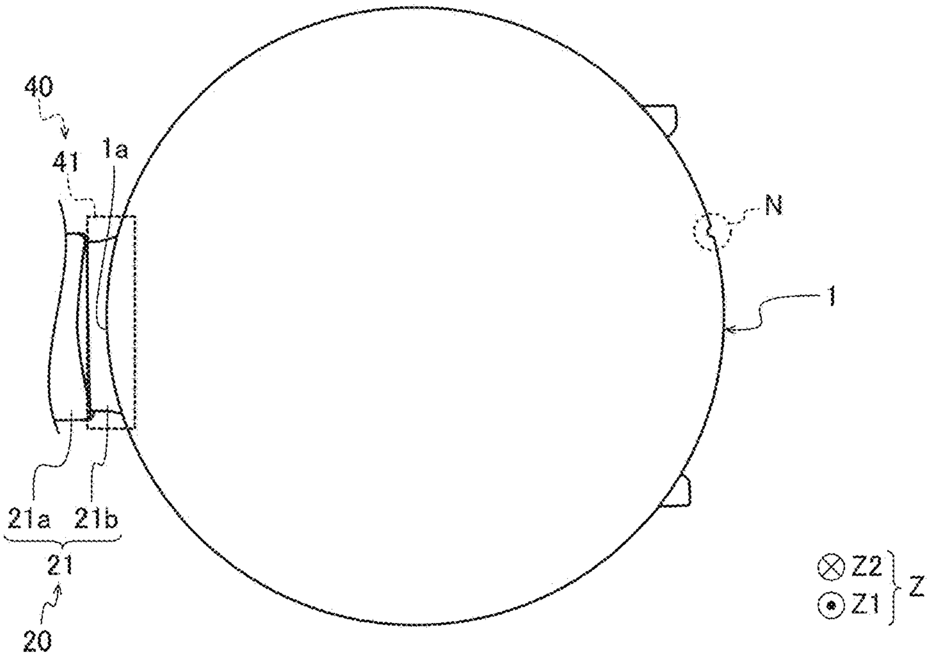
FIG. 6 is a diagram showing the lower hand according to the first embodiment as viewed from the upper side.

The sensor 40, which includes the laser sensors 41 and 42, detects a part of an outline shape of the substrate 1 in which an outer edge 1*a* of the substrate 1 overlaps the substrate-handling hand 20 as viewed from the lower side. Specifically, as shown in FIG. 6, the laser sensor 41 detects the part of the outline shape of the substrate 1 in which the outer edge 1*a* of the substrate 1 overlaps the lower hand 21 of the substrate-handling hand 20 as viewed the lower side.

Figure 7:
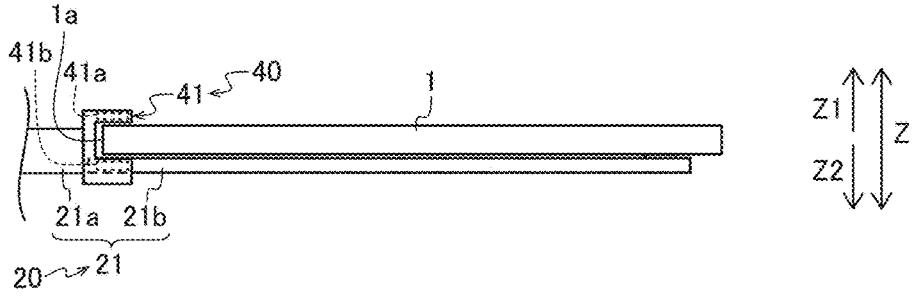
FIG. 7 is a side view showing a configuration of a laser sensor attached to the lower hand.

Also, the irradiator 41*a* and the detector 41*b* are arranged to interpose the substrate 1 between them in Z direction as shown in FIG. 7. The irradiator 41*a* irradiates the part in which the outer edge 1*a* of the substrate 1 overlaps the lower hand 21 of the substrate-handling hand 20 as viewed from the lower side with laser light. The irradiator 41*a* irradiates the part with laser light in a line extending in a direction in which the hand base 21*a* and the blade 21*b* are arranged adjacent to each other. If the notch N exists in a part between the irradiator 41*a* and the detector 41*b*, the laser light is not cut off by the substrate 1 so that the laser light from the irradiator 41*a* is detected by the detector 41*b*. Accordingly, the laser sensor 41 can detect whether the notch N exists in the part in which the laser sensor 41 is attached. Subsequently, the controller 60 can acquire the positional information on the notch N in the substrate 1 based on the detection result detected by the laser sensor 41.

Figure 8:
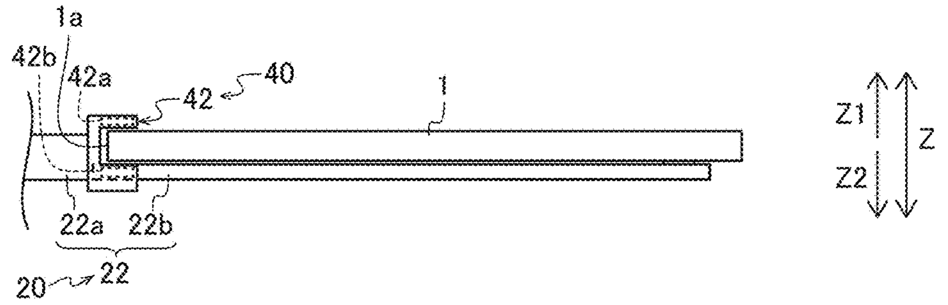
FIG. 8 is a side view showing a configuration of a laser sensor attached to the upper hand.

Also, similar to the laser sensor 41, the laser sensor 42 detects the part of the outline shape of the substrate 1 in which the outer edge 1*a* of the substrate 1 overlaps the lower hand 21 of the substrate-handling hand 20 as viewed the lower side. Also, the irradiator 42*a* and the detector 42*b* are arranged to interpose the substrate 1 between them in Z direction as shown in FIG. 8. Similar to the irradiator 41*a*, the irradiator 42*a* irradiates the part in which the outer edge 1*a* of the substrate 1 overlaps the upper hand 22 of the substrate-handling hand 20 as viewed from the lower side with laser light. The irradiator 42*a* irradiates the part with laser light in a line extending in a direction in which the hand base 22*a* and the blade 22*b* are arranged adjacent to each other. Also, similar to the laser sensor 41, the laser sensor 42 detects the part of the outline shape of the substrate 1 in which the outer edge 1*a* of the substrate 1 overlaps the upper hand 22 of the substrate-handling hand 20 as viewed the lower side. Subsequently, the controller 60 can acquire the positional information on the notch N in the substrate 1 based on the detection result detected by the laser sensor 42.

In the first embodiment, the controller 60 acquires misalignment of the substrate 1 that is supported by the blade 21*b* of the lower hand 21 and misalignment of the substrate 1 that is supported by the blade 21*b* of the upper hand 22 based on the images captured by the image capturer 30 in addition to the positional information on the notch N in the substrate 1. Accordingly, the controller 60 can determine whether the lower hand 21 and the upper hand 22 fail to support the substrates 1.

(Operations of Substrate-Conveying Robot)

The following description describes exemplary acquisition of the positional information on the notch N in the substrate 1 conveyed by the lower hand 21 by the controller 60 of the substrate-conveying robot 101.

The controller 60 first moves the horizontal multi-joint robot arm 10 so that the lower hand 21 enters the substrate storage 104, and moves to a part on the lower side with respect to the substrate 1 stored in the substrate storage 104. The lower hand 21, which has entered the substrate storage 104, is moved upward to support the substrate 1 on the lower side by moving the horizontal multi-joint robot arm 10 upward based on control of the controller 60.

Subsequently, the controller 60 moves the horizontal multi-joint robot arm 10 to retract the lower hand 21 from the substrate storage 104. As shown in FIG. 2, the substrate-conveying robot 101 moves the upper hand 22 into the substrate storage 104, and rotates the lower hand 21, which is supporting the substrate 1, about the third joint 53 as the rotation axis to position the distal end of the lower hand 21 to a position in proximity to the second joint 52. Accordingly, the substrate 1 that is conveyed by the lower hand 21 is positioned to overlap the image capturer 30.

Subsequently, the image capturer 30 captures the image of the substrate 1 that is conveyed by the lower hand 21 based on the control of the controller 60. The controller 60 controls the laser sensor 41 to detect the outline shape of the substrate 1 that is conveyed by the lower hand 21.

Subsequently, the controller 60 acquires the positional information on the notch N in the substrate 1 that is conveyed by the lower hand 21 based on the image of the substrate 1 captured by the image capturer 30 from the lower side, and a detection result detected by the laser sensor 41 in the conveyance of the substrate 1 while conveying the substrate 1 by using the lower hand 21 and the upper hand 22.

Here, the image of the substrate 1 that is conveyed by the upper hand 22 is captured by the image capturer 30 when the substrate is positioned to overlap the image capturer 30 based on the control of the controller 60. Also, the controller 60 detects the outline shape of the substrate 1 that is conveyed by the upper hand 22 by using the laser sensor 42. Subsequently, the controller 60 acquires the positional information on the notch N in the substrate 1 that is conveyed by the upper hand 22 based on the image of the substrate 1 captured by the image capturer 30 from the lower side, and a detection result detected by the laser sensor 42 in the conveyance of the substrate 1 while conveying the substrate 1 by using the lower hand 21 and the upper hand 22.

(Advantages of First Embodiment)

The substrate-conveying robot system 100 and the substrate-conveying robot 101 include the image capturer 30, and the controller 60 for acquiring positional information on the notch N in the substrate 1 conveyed by the substrate-handling hand 20. The controller 60 acquires the positional information on the notch N in the substrate 1 conveyed by the substrate-handling hand 20 based on images captured by the image capturer 30 from the lower side with respect to the substrate-handling hand 20 in conveyance of the substrate 1. Accordingly, the positional information on the notch N in the substrate 1 can be acquired without stopping conveyance of the substrate 1 dissimilar to a case in which the positional information is detected by an aligner on a way of conveying the substrate 1. As a result, the positional information on the notch N in the substrate 1 can be acquired while reducing an increase of time for conveying the substrate 1.

In the substrate-conveying robot system 100, an image of the substrate 1 conveyed by the substrate-handling hand 20 is captured at a position that overlaps the conveyance path of the substrate 1 conveyed by the substrate-handling hand 20 as viewed from the upper side by the image capturer 30 from the lower side with respect to the substrate-handling hand 20. Accordingly, it is not required to change the conveyance path of the substrate 1 conveyed by the substrate-handling hand 20 according to a position of the image capturer 30. Consequently, it is possible to reduce an increase of time for conveying the substrate 1 due to the change of the conveyance path according to the position of the image capturer 30.

The image capturer 30 is arranged on the lower side with respect to the substrate-handling hand 20. Accordingly, it is possible to reduce an increase of size in a height direction of the substrate-conveying robot 101 as compared with a case in which the image capturer 30 is arranged on the upper side with respect to the substrate-handling hand 20.

The substrate-conveying robot system 100 includes the sensor 40 for detecting a part of an outline shape of the substrate 1 in which the outer edge 1*a* of the substrate 1 overlaps the substrate-handling hand 20 as viewed from the lower side. The controller 60 acquires the positional information on the notch N in the substrate 1 conveyed by the substrate-handling hand 20 based on the image captured by the image capturer 30 from the lower side in the conveyance of the substrate 1 and a detection result detected by the sensor 40 in the conveyance of the substrate 1. Accordingly, the controller 60 can also acquire the positional information on the notch N in the part in which the outer edge 1*a* of the substrate 1 overlaps the substrate-handling hand 20 as viewed from the lower side based on a detection result detected by the sensor 40 in the conveyance of the substrate 1. Consequently, it is possible to acquire the positional information on the notch N in the substrate 1 in more detail.

The sensor 40 includes the irradiators 41*a* and 42*a* for irradiating the part in which the outer edge 1*a* of the substrate 1 overlaps the substrate-handling hand 20 as viewed from the lower side with laser light; and the detectors 41*b* and 42*b* for detecting the laser light with which the part is irradiated by the irradiator 41*a* and 42*a*. Accordingly, the controller 60 can acquire the positional information on the notch N in the part in which the outer edge 1*a* of the substrate 1 overlaps the substrate-handling hand 20 as viewed from the lower side based on the detection results detected by the detectors 41*b* and 42*b*, which detect laser light with which the part is irradiated by the irradiator 41*a* and 42*a*.

The substrate-conveying robot system 100 includes the horizontal multi-joint robot arm 10 to which the substrate-handling hand 20 is attached and that is arranged on the lower side with respect to the substrate-handling hand 20. Also, the image capturer 30 is arranged in the horizontal multi-joint robot arm 10. According to this configuration, since the image capturer 30 is arranged in the horizontal multi-joint robot arm 10, which is arranged on the lower side with respect to the substrate-handling hand 20, it is possible to reduce an increase of size in a height direction of the substrate-conveying robot 101 as compared with a case in which the image capturer 30 is arranged on the upper side with respect to the substrate-handling hand 20.

The horizontal multi-joint robot arm 10 includes the first arm 11, and the second arm 12, which is arranged on the upper side with respect to the first arm 11 and connected to the first arm 11. The image capturer 30 is arranged on the upper surface 12*a* of the second arm 12. According to this configuration, since the image capturer 30 is arranged in the upper surface 12*a* of the second arm 12, which is arranged on the upper side with respect to the first arm 11, an image of the substrate 1 can be captured from the lower side without obstruction by the first arm 11. Consequently, it is possible to capture the image of the substrate 1 conveyed by the substrate-handling hand 20 from the lower side in the conveyance of the substrate 1 irrespective of the position of the first arm 11.

The substrate-handling hand 20 includes a lower hand 21 arranged on an upper side with respect to the second arm 12, and an upper hand 22 arranged on an upper side with respect to the lower hand 21. In the substrate-handling hand 20, when one of the lower hand 21 and the upper hand 22 enters the substrate storage 104, which stores the substrates 1, in conveyance of the substrates 1, another of the lower hand 21 and the upper hand 22 that is holding the substrate 1 is moved to an avoidance position that is positioned on the upper side with respect to the second arm 12 and overlaps the second arm. The controller 60 acquires the positional information on the notch N in the substrate 1 conveyed by the substrate-handling hand 20 based on the image of the substrate 1 that is captured from the lower side in the conveyance of the substrate 1 when the another of the lower hand and the upper hand is moved to the avoidance position. Accordingly, the positional information on the notch N in the substrate 1 can be acquired based on the image of the substrate 1, which is captured from the lower side with a relative position of the image capturer 30 arranged in the second arm 12 relative to the substrate 1 being unchanged. Consequently, the positional information on the notch N in the substrate 1 can be acquired based on the image of the substrate, which is accurately captured as compared with a case in which an image of the substrate 1 that is captured from the lower side with a relative position of the image capturer 30 being changed relative to the substrate 1 is used to acquire positional information on the notch N in the substrate 1. As a result, it is possible to accurately capture the positional information on the notch N in the substrate 1.

The controller 60 outputs the acquired positional information on the notch N in the substrate 1 to the production-apparatus controller 105, which controls the substrate processor 102 to which the substrate 1 is conveyed. Accordingly, the production-apparatus controller 105 can apply processing to the substrates 1 by using the substrate processor 102 in accordance with the positional information on the notch N in the substrate 1 acquired by the controller 60.

The controller 60 controls capture of the image of the substrate 1 conveyed by the substrate-handling hand 20 from the lower side by using the image capturer 30 in the conveyance of the substrate 1 by using the substrate-handling hand 20 in addition to acquisition of the positional information on the notch N in the substrate 1. Accordingly, it is possible to prevent the substrate-conveying robot system 100 from becoming complicated as compared with a case in which a controller separate from the controller 60, which acquires positional information of the notches N in the substrate 1, controls capture of an image by using the image capturer 30.

Second Embodiment

Figure 9:
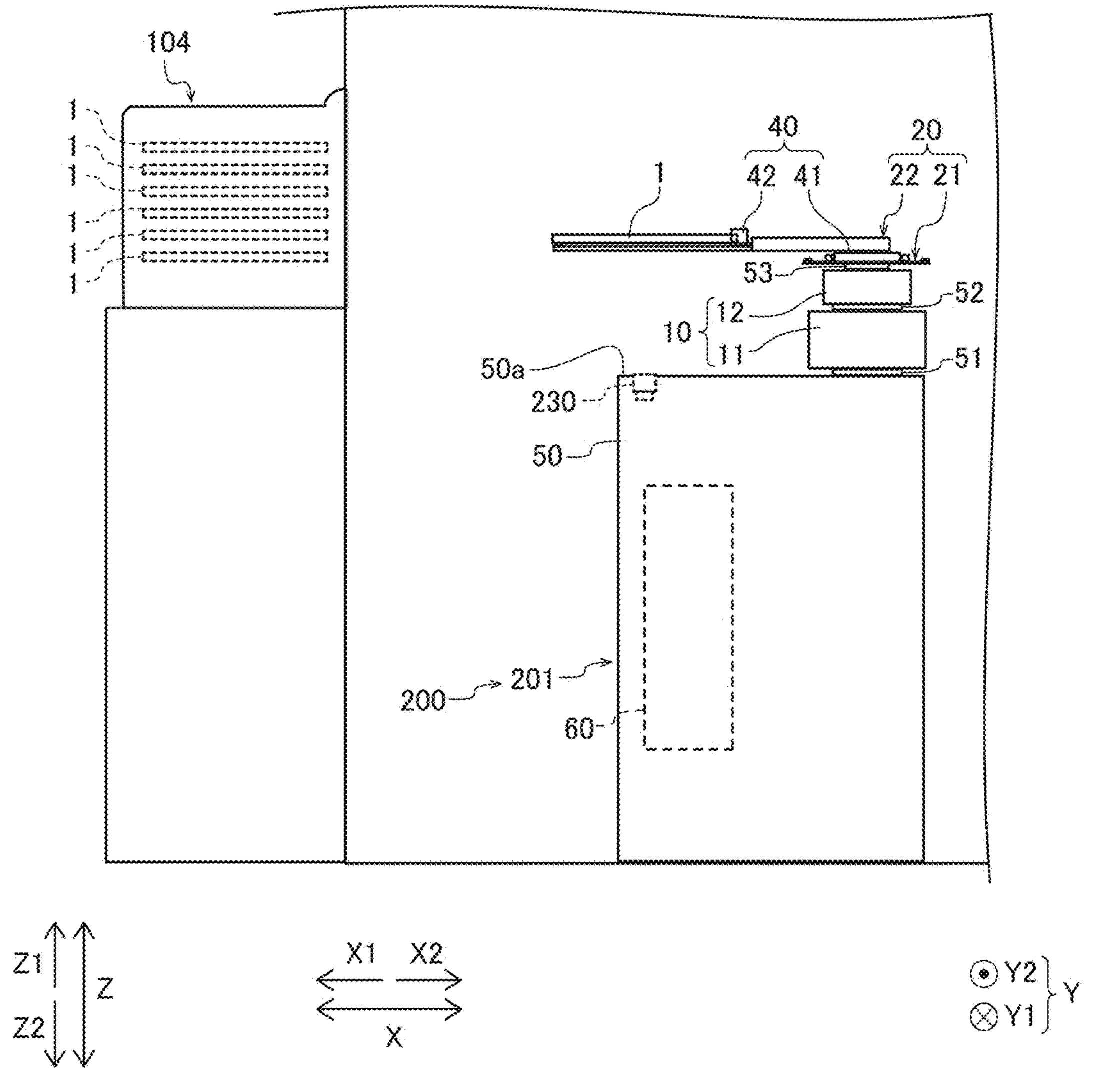
FIG. 9 is a side view showing a configuration of a substrate-conveying robot according to a second embodiment.

The following description describes a configuration of a substrate-conveying robot system 200 according to a second embodiment with reference to FIG. 9.

As shown in FIG. 9, dissimilar to the substrate-conveying robot 101 of the substrate-conveying robot system 100 according to the first embodiment, which includes the image capturer 30 in the second arm 12, a substrate-conveying robot 201 of a substrate-conveying robot system 200 according to the second embodiment includes an image capturer 230 in the base 50, which is attached to the horizontal multi-joint robot arm 10. In the second embodiment, the image capturer 230 is arranged at a position that overlaps a conveyance path of the substrate 1 by the substrate-handling hand 20 conveyed by the substrate-handling hand as viewed from an upper side in the base 50, which is arranged on the lower side with respect to the substrate-handling hand 20. The image capturer 230 is arranged in an upper surface 50*a* of the base 50. The image capturer 230 is arranged between the substrate storage 104 and the first joint 51 in the X direction. The substrate-conveying robot system 200 captures an image of the substrate 1 conveyed pit of the substrate storage 104 from the lower side by using the image capturer 230 arranged in the base 50.

The other configuration of the second embodiment is similar to the first embodiment.

[Advantages of Second Embodiment]

In the substrate-conveying robot system 200 according to the second embodiment, similar to the aforementioned first embodiment, positional information on the notch N in the substrate 1 can be acquired while reducing an increase of time for conveying the substrate 1.

The substrate-conveying robot system 200 includes the horizontal multi-joint robot arm 10 to which the substrate-handling hand 20 is attached and that is arranged on the lower side with respect to the substrate-handling hand 20, and the base 50 that is arranged on the lower side with respect to the horizontal multi-joint robot arm 10 and to which the horizontal multi-joint robot arm 10 is attached. The image capturer 230 is arranged at a position that overlaps the conveyance path of the substrate 1 by the substrate-handling hand 20 conveyed by the substrate-handling hand as viewed from the upper side in the base 50, which is arranged on the lower side with respect to the substrate-handling hand 20. According to this configuration, since the image capturer 30 is arranged in the base 50, which is arranged on the lower side with respect to the substrate-handling hand 20, it is possible to reduce an increase of size in a height direction of the substrate-conveying robot 201 as compared with a case in which the image capturer 30 is arranged on the upper side with respect to the substrate-handling hand 20.

The other advantages of the second embodiment are similar to the first embodiment.

Third Embodiment

Figure 10:
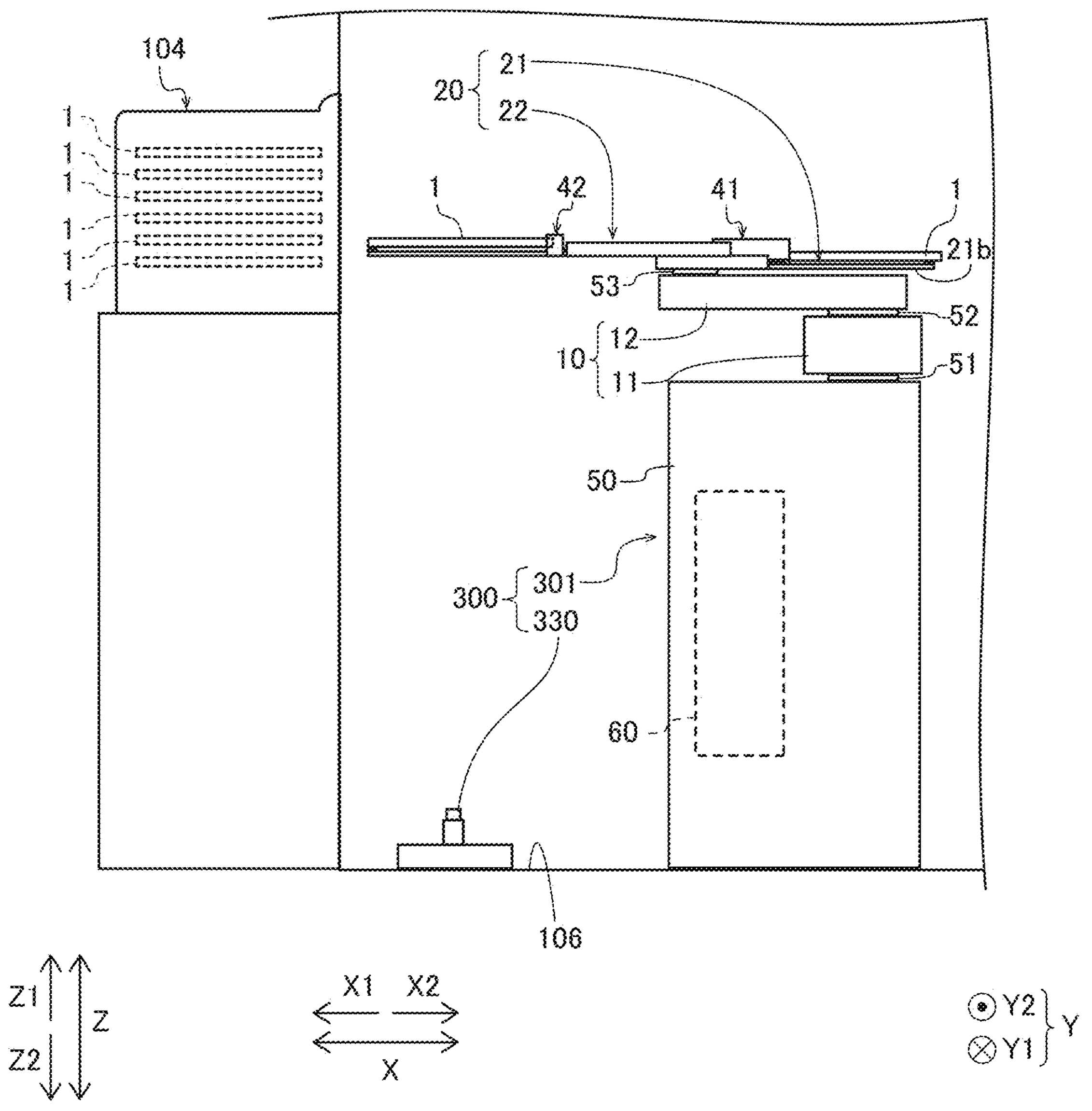
FIG. 10 is a side view showing a configuration of a substrate-conveying robot according to a third embodiment.

The following description describes a configuration of a substrate-conveying robot system 300 according to a third embodiment with reference to FIG. 10.

As shown in FIG. 10, dissimilar to the substrate-conveying robot system 100 according to the first embodiment, which includes the image capturer 30 in the second arm 12, a substrate-conveying robot system 300 according to the third embodiment includes an image capturer 330 arranged on a floor surface 106. The image capturer 330 is arranged at a position that overlaps a conveyance path of the substrate 1 by the substrate-handling hand 20 conveyed by the substrate-handling hand as viewed from an upper side in the floor surface 106, which is arranged on the lower side with respect to the substrate-handling hand 20. The image capturer 330 is arranged between the substrate storage 104 and the base 50 of the substrate-conveying robot 301 in the X direction. The substrate-conveying robot system 300 captures an image of the substrate 1 conveyed pit of the substrate storage 104 from the lower side by using the image capturer 330 arranged in the floor surface 106.

The other configuration of the third embodiment is similar to the first embodiment.

[Advantages of Third Embodiment]

In the substrate-conveying robot system 300 according to the third embodiment, similar to the aforementioned first and second embodiments, positional information on the notch N in the substrate 1 can be acquired while reducing an increase of time for conveying the substrate 1.

The image capturer 30 is arranged at a position that overlaps a conveyance path of the substrate 1 by the substrate-handling hand 20 conveyed by the substrate-handling hand as viewed from an upper side in the floor surface 106, which is arranged on the lower side with respect to the substrate-handling hand 20. According to this configuration, since the image capturer 30 is arranged in the floor surface 106 arranged on the lower side with respect to the substrate-handling hand 20, it is possible to reduce an increase of size in a height direction of the substrate-conveying robot 301 as compared with a case in which the image capturer 30 is arranged on the upper side with respect to the substrate-handling hand 20.

The other advantages of the third embodiment are similar to the first embodiment.

Also, two or more of the first, second and third embodiments may be combined.

Modified Embodiments

Note that the embodiment disclosed this time must be considered as illustrative in all points and not restrictive. The scope of the present disclosure is not shown by the above description of the embodiments but by the scope of claims for patent, and all modifications and modified embodiments within the meaning and scope equivalent to the scope of claims for patent are further included.

While the example in which the controller 60 acquires positional information on the notch N in the substrate 1 conveyed by the substrate-handling hand 20 based on the image captured by the image capturer 30 in conveyance of the substrate 1 has been shown in the aforementioned first embodiment, the present disclosure is not limited to this. In the present disclosure, the controller may acquire positional information on an orientation flat in the substrate conveyed by the substrate-handling hand based on an image captured by the image capturer from the lower side in conveyance of the substrate.

Figure 11:
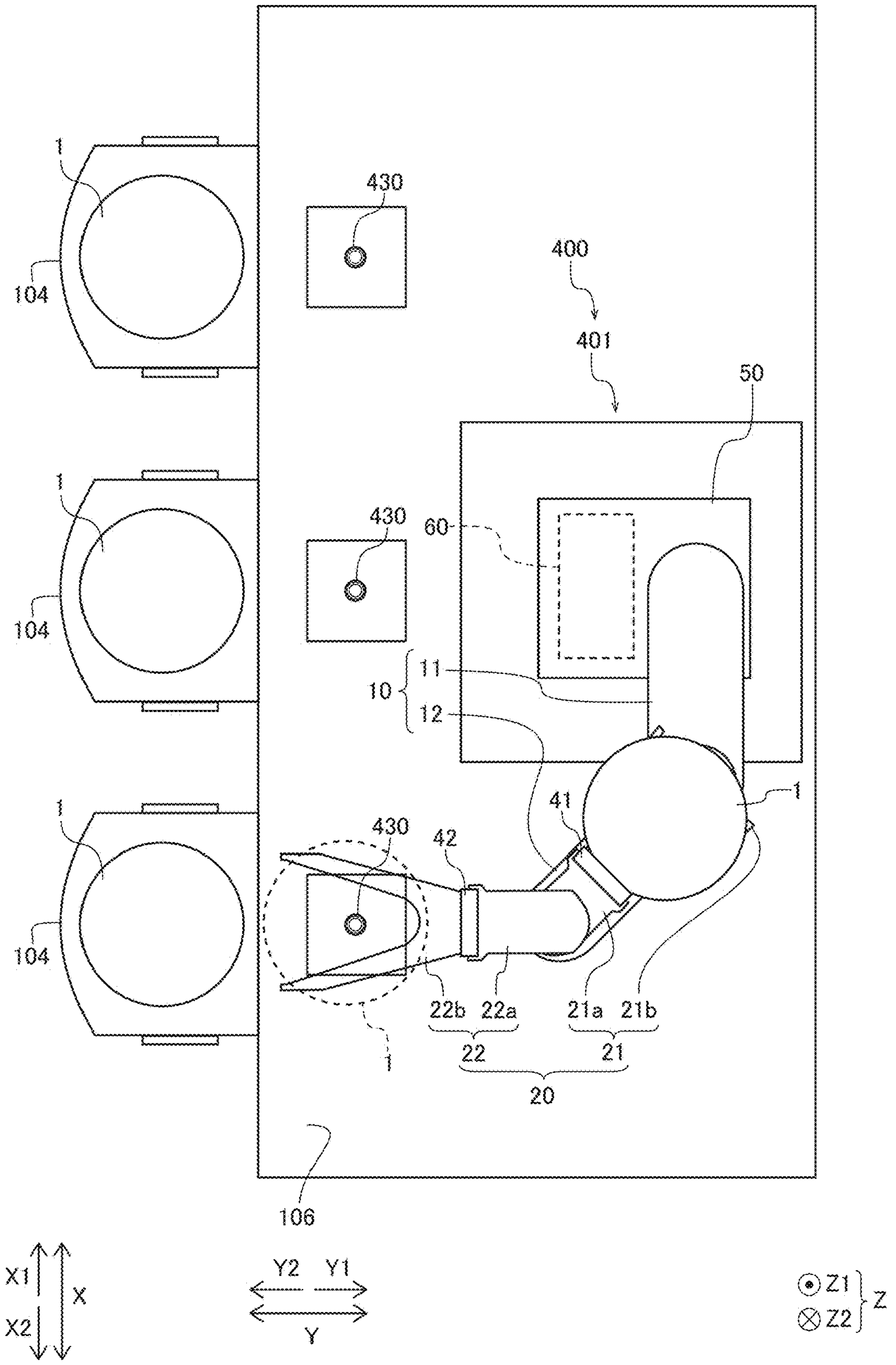
FIG. 11 is a view showing arrangement of image capturers according to a modified embodiment.

While the example in which one image capturer 30 is arranged in the second arm 12 has been shown in the first aforementioned embodiment, the present disclosure is not limited to this. In the present disclosure, a plurality of image capturers may be arranged in the second arm. Also, a plurality of image capturers 430 corresponding to the plurality of substrate storages 104 may be provided as in a substrate-conveying robot system 400 and a substrate-conveying robot 401 according to a modified embodiment shown in FIG. 11. In the exemplary modified embodiment shown in FIG. 11, three image capturers 430 including CCD image sensors or CMOS image sensors corresponding to three substrate storages 104, are arranged on the floor surface 106.

While the example in which an image of the substrate 1 conveyed by the substrate-handling hand 20 is captured at a position that overlaps the conveyance path of the substrate 1 conveyed by the substrate-handling hand 20 as viewed from the upper side by the image capturer 30 from the lower side with respect to the substrate-handling hand 20 in the substrate-conveying robot systems 100, 200 and 300 has been shown in the first aforementioned embodiment, the present disclosure is not limited to this. In the present disclosure, an image capturer may be placed in a at a position that does not overlap the conveyance path of the substrate conveyed by the substrate-handling hand as viewed from the upper side to capture an image of the substrate passing through the conveyance path. In other words, the image capturer may capture an image of the substrate not from directly below the conveyance path of the substrate but from a diagonally lower side with respect to the conveyance path.

While the example in which the controller 60 acquires positional information on the notch N in the substrate 1 conveyed by the substrate-handling hand 20 based on the image captured by the image capturer 30 from the lower side in the conveyance of the substrate 1 and a detection result detected by the sensor 40 in the conveyance of the substrate 1 has been shown in the first aforementioned embodiment, the present disclosure is not limited to this. In the present disclosure, the controller may acquire determination whether the notch or the orientation flat exists at a position that overlaps the substrate-handling hand as the positional information on the notch or the orientation flat in the substrate conveyed by the substrate-handling hand based on only an image captured by the image capturer from the lower side in conveyance of the substrate. Also, a transparent material may be used for the substrate-handling hand so that the controller may acquire the positional information on the notch or the orientation flat in the substrate based only on an image captured from the lower side by the image capturer.

While the example in which the laser sensors 41 and 52 include laser line sensors has been shown in the aforementioned first embodiment, the present disclosure is not limited to this. In the present disclosure, the sensor may include a TOF (Time of Flight) sensor or a LiDAR (Light Detection And Ranging) sensor. In this configuration, the detector is arranged at a position that allows the detector to detect laser light with which a part of the substrate is irradiated by the irradiator and which is reflected from the substrate. For example, the irradiator and the detector are arranged to face the substrate, and are arranged adjacent to each other. An outline shape of the substrate is detected by detecting the laser light with which the part of the substrate is irradiated by the irradiator and which is reflected from the substrate by using the detector. Also, the sensor may include s sensor that does not use laser light, such as illuminance sensor.

While the example in which the substrate-conveying robot 101 of the substrate-conveying robot system 100 includes the horizontal multi-joint robot arm 10 including the first arm 11 and the second arm 12 has been shown in the aforementioned first embodiment, the present disclosure is not limited to this. In the present disclosure, the substrate-conveying robot of the substrate-conveying robot system may be a linear-motion-mechanism type substrate-conveying robot for moving substrate-handling hands along a rail.

While the example in which the image capturer 30 is arranged in the upper surface 12*a* of the second arm 12 has been shown in the aforementioned first embodiment, the present disclosure is not limited to this. In the present disclosure, the image capturer may be arranged on a side of the second arm so as to capture an image of the substrate from the lower side.

While the example in which when the upper hand 22 enters the substrate storage 104 in the conveyance of the substrate 1, the lower hand 21 that is holding the substrate 1 in the substrate-handling hand 20 is moved to the avoidance position, which is positioned on the upper side with respect to the second arm 12 and overlaps the second arm, and positional information on the notch N in the substrate 1 conveyed by the lower hand 21 is acquired based on the image of the substrate 1 that is captured from the lower side when the lower hand is moved to the avoidance position has been shown in the aforementioned first embodiment, the present disclosure is not limited to this. In the present disclosure, when the first hand arranged on the lower side with respect to the second hand enters the substrate storage in the conveyance of the substrate, the second hand that is holding the substrate in the substrate-handling hand may be moved to the avoidance position, which is positioned on the upper side with respect to the second arm and overlaps the second arm, and the positional information on the notch or the orientation flat in the substrate conveyed by the second hand may be acquired based on the image of the substrate that is captured from the lower side when the second hand is moved to the avoidance position.

While the example in which the substrate-handling hand 20 includes the lower hand 21 and the lower hand 21 has been shown in the aforementioned first embodiment, the present disclosure is not limited to this. In the present disclosure, the substrate-conveying robot may be a single-hand robot including only one substrate-handling hand, or including three or more substrate-handling hands.

While the example in which the controller controls capture of the image of the substrate 1 conveyed by the substrate-handling hand 20 from the lower side by using the image capturer 30 in the conveyance of the substrate 1 by using the substrate-handling hand 20 in addition to acquisition of the positional information on the notch N in the substrate 1 has been shown in the aforementioned first embodiment, the present disclosure is not limited to this. In the present disclosure, the substrate-conveying robot system and the substrate-conveying robot may include a controller that controls capture of images by the image capturer, and a separate controller that acquires positional information on the notch or the orientation flat in the substrate.

While the example in which the substrate-conveying robot 101 includes the controller 60 for acquiring the positional information on the notch or the orientation flat in the substrate has been shown in the aforementioned first embodiment, the present disclosure is not limited to this. In the present disclosure, in the substrate-conveying robot system, the controller for acquiring the positional information on the notch or the orientation flat in the substrate may be provided outside the substrate-conveying robot 101. In other words, the substrate-conveying robot system may include a controller that controls the entire substrate-conveying robot, and a separate controller that acquires the positional information on the notch or the orientation flat in the substrate.

Functions of elements disclosed in this specification can be realized by a circuit or processing circuit including a general purpose processor, a dedicated processor, an integrated circuit, ASIC (Application Specific Integrated Circuits), a conventional circuit and/or combination of them configured or programmed to realize the functions disclosed. Because processors include transistors and other circuits, they are considered as a processing circuit or a circuit. In the present disclosure, circuits, units or means are hardware for realizing the functions stated above, or hardware programmed to realize the functions stated above. The hardware can be hardware disclosed in this specification, or can be other known hardware programed or configured to realize the functions stated above. In the case in which the hardware is a processor that can be considered as one type of circuits, the circuit, means or unit is a combination of hardware and software, and the software is used for configuration of the hardware and/or the processor.

While the example in which the image capturer 30 is arranged on the lower side with respect to the substrate-handling hand 20 has been shown in the aforementioned first embodiment, the present disclosure is not limited to this. In the present disclosure, the image capturer is required to be positioned on the lower side with respect to the substrate-handling hand at least when capturing an image of the substrate. That is, the image capturer may be arranged at the same height as the substrate-handling hand or at a height higher than the substrate-handling hand except when capturing an image of the substrate, and be moved to the lower side with respect to the substrate-handling hand when capturing the image of the substrate.

[Modes]

The aforementioned exemplary embodiment will be understood as concrete examples of the following modes by those skilled in the art.

(Mode Item 1)

A substrate-conveying robot system includes a substrate-handling hand for conveying a substrate; an image capturer; and a controller, wherein the controller acquires positional information on a notch or an orientation flat in the substrate conveyed by the substrate-handling hand based on an image captured by the image capturer from a lower side with respect to the substrate-handling hand in conveyance of the substrate.

(Mode Item 2)

In the substrate-conveying robot system according to mode item 1, the image of the substrate conveyed by the substrate-handling hand is captured at a position that overlaps a conveyance path of the substrate conveyed by the substrate-handling hand as viewed from an upper side by the image capturer from the lower side with respect to the substrate-handling hand.

(Mode Item 3)

In the substrate-conveying robot system according to mode item 1 or 2, the image capturer is arranged on the lower side with respect to the substrate-handling hand.

(Mode Item 4)

In the substrate-conveying robot system according to any of mode items 1 to 3, a sensor for detecting a part of an outline shape of the substrate in which an outer edge of the substrate overlaps the substrate-handling hand as viewed from the lower side is further provided; and the controller acquires the positional information on the notch or the orientation flat in the substrate conveyed by the substrate-handling hand based on the image captured by the image capturer from the lower side in the conveyance of the substrate and a detection result detected by the sensor in the conveyance of the substrate.

(Mode Item 5)

In the substrate-conveying robot system according to mode item 4, the sensor includes an irradiator for irradiating the part in which the outer edge of the substrate overlaps the substrate-handling hand as viewed from the lower side with laser light; and a detector for detecting the laser light with which the part is irradiated by the irradiator.

(Mode Item 6)

In the substrate-conveying robot system according to any of mode items 1 to 5, a horizontal multi-joint robot arm to which the substrate-handling hand is attached and that is arranged on the lower side with respect to the substrate-handling hand is further provided; and the image capturer is provided to the horizontal multi-joint robot arm.

(Mode Item 7)

In the substrate-conveying robot system according to mode item 6, the horizontal multi-joint robot arm includes a first arm, and a second arm arranged on the upper side with respect to the first arm and connected to the first arm; and the image capturer is arranged in an upper surface of the second arm.

(Mode Item 8)

In the substrate-conveying robot system according to mode item 7, the substrate-handling hand includes a first hand arranged on the upper side with respect to the second arm, and a second hand arranged on the upper side with respect to the first hand; when one of the first hand and the second hand enters a substrate storage for storing the substrate in the conveyance of the substrate, another of the first hand and the second hand that is holding the substrate is moved to an avoidance position that is positioned on the upper side with respect to the second arm and overlaps the second arm; and the controller acquires the positional information on the notch or the orientation flat in the substrate conveyed by the substrate-handling hand based on the image of the substrate that is captured from the lower side when the another of the first hand and the second hand is moved to the avoidance position in the conveyance of the substrate.

(Mode Item 9)

In the substrate-conveying robot system according to any of mode items 1 to 5, a horizontal multi-joint robot arm to which the substrate-handling hand is attached and that is arranged on the lower side with respect to the substrate-handling hand; and a base that is arranged on the lower side with respect to the horizontal multi-joint robot arm and to which the horizontal multi-joint robot arm is attached are further provided, wherein the image capturer is arranged at a position that overlaps a conveyance path of the substrate conveyed by the substrate-handling hand as viewed from an upper side in the base, which is arranged on the lower side with respect to the substrate-handling hand.

(Mode Item 10)

In the substrate-conveying robot system according to any of mode items 1 to 5, the image capturer is arranged at a position that overlaps a conveyance path of the substrate conveyed by the substrate-handling hand as viewed from an upper side on a floor surface arranged on the lower side with respect to the substrate-handling hand.

(Mode Item 11)

In the substrate-conveying robot system according to any of mode items 1 to 10, the controller outputs the acquired positional information on the notch or the orientation flat in the substrate to a control apparatus for controlling a conveyance destination apparatus to which the substrate is conveyed.

(Mode Item 12)

In the substrate-conveying robot system according to any of mode items 1 to 11, the controller controls capture of the image of the substrate conveyed by the substrate-handling hand from the lower side by using the image capturer in the conveyance of the substrate by using the substrate-handling hand in addition to acquisition of the positional information on the notch or the orientation flat in the substrate.

(Mode Item 13)

A substrate-conveying robot includes a substrate-handling hand for conveying a substrate; an image capturer arranged on a lower side with respect to the substrate-handling hand; and a controller, wherein the controller acquires positional information on a notch or an orientation flat in the substrate conveyed by the substrate-handling hand based on an image captured by the image capturer from a lower side in conveyance of the substrate.

The invention claimed is:

1. A substrate-conveying robot system comprising:

a substrate-handling hand for conveying a substrate;

an image capturer;

a controller; and a horizontal multi-joint robot arm to which the substrate-handling hand is attached and that is arranged on the lower side with respect to the substrate-handling hand, the horizontal multi-joint robot arm includes a first arm, and a second arm arranged on the upper side with respect to the first arm and connected to the first arm, wherein the controller acquires positional information on a notch or an orientation flat in the substrate conveyed by the substrate-handling hand based on an image captured by the image capturer from a lower side with respect to the substrate-handling hand in conveyance of the substrate;

the image capturer is arranged on the lower side with respect to the substrate-handling hand;

the image capturer is provided to the horizontal multi-joint robot arm; and the image capturer is arranged in an upper surface of the second arm;

the substrate-handling hand includes a first hand arranged on the upper side with respect to the second arm, and a second hand arranged on the upper side with respect to the first hand;

when one of the first hand and the second hand enters a substrate storage for storing the substrate in the conveyance of the substrate, another of the first hand and the second hand that is holding the substrate is moved to an avoidance position that is positioned on the upper side with respect to the second arm and overlaps the second arm; and the controller acquires the positional information on the notch or the orientation flat in the substrate conveyed by the substrate-handling hand based on the image of the substrate that is captured from the lower side when the other of the first hand and the second hand is moved to the avoidance position in the conveyance of the substrate.

2. The substrate-conveying robot system according to claim 1, wherein the image of the substrate conveyed by the substrate-handling hand is captured at a position that overlaps a conveyance path of the substrate conveyed by the substrate-handling hand as viewed from an upper side by the image capturer from the lower side with respect to the substrate-handling hand.

3. The substrate-conveying robot system according to claim 1 further comprising a sensor for detecting a part of an outline shape of the substrate in which an outer edge of the substrate overlaps the substrate-handling hand as viewed from the lower side, wherein the controller acquires the positional information on the notch or the orientation flat in the substrate conveyed by the substrate-handling hand based on the image captured by the image capturer from the lower side in the conveyance of the substrate and a detection result detected by the sensor in the conveyance of the substrate.

4. The substrate-conveying robot system according to claim 3, wherein the sensor includes an irradiator for irradiating the part in which the outer edge of the substrate overlaps the substrate-handling hand as viewed from the lower side with laser light; and a detector for detecting the laser light with which the part is irradiated by the irradiator.

5. The substrate-conveying robot system according to claim 1 further comprising:

a base that is arranged on the lower side with respect to the horizontal multi-joint robot arm and to which the horizontal multi-joint robot arm is attached, wherein the image capturer is arranged at a position that overlaps a conveyance path of the substrate conveyed by the substrate-handling hand as viewed from an upper side in the base, which is arranged on the lower side with respect to the substrate-handling hand.

6. The substrate-conveying robot system according to claim 1, wherein the image capturer is arranged at a position that overlaps a conveyance path of the substrate conveyed by the substrate-handling hand as viewed from an upper side on a floor surface arranged on the lower side with respect to the substrate-handling hand.

7. The substrate-conveying robot system according to claim 1, wherein the controller outputs the acquired positional information on the notch or the orientation flat in the substrate to a control apparatus for controlling a conveyance destination apparatus to which the substrate is conveyed.

8. The substrate-conveying robot system according to claim 1, wherein the controller controls capture of the image of the substrate conveyed by the substrate-handling hand from the lower side by using the image capturer in the conveyance of the substrate by using the substrate-handling hand in addition to acquisition of the positional information on the notch or the orientation flat in the substrate.

9. A substrate-conveying robot system comprising:

a substrate-handling hand for conveying a substrate;

an image capturer;

a controller; and a horizontal multi-joint robot arm to which the substrate-handling hand is attached and that is arranged on the lower side with respect to the substrate-handling hand, the horizontal multi-joint robot arm includes a first arm, and a second arm arranged on the upper side with respect to the first arm and connected to the first arm, wherein the substrate-handling hand includes a first hand arranged on the upper side with respect to the second arm, and a second hand arranged on the upper side with respect to the first hand;

the controller is configured to control the substrate-conveying robot system so that, when one of the first hand and the second hand enters a substrate storage for storing the substrate in conveyance of the substrate, another of the first hand and the second hand that is holding the substrate is moved to an avoidance position that is positioned on the upper side with respect to the second arm and overlaps the second arm; and the controller acquires positional information on a notch or an orientation flat in the substrate conveyed by the substrate-handling hand based on an image of the substrate that is captured from a lower side when the other of the first hand and the second hand is moved to the avoidance position in the conveyance of the substrate.

10. A method of operating a substrate-conveying robot system that includes a substrate-handling hand for conveying a substrate, an image capturer, a horizontal multi-joint robot arm to which the substrate-handling hand is attached and that is arranged on the lower side with respect to the substrate-handling hand, the horizontal multi-joint robot arm includes a first arm, and a second arm arranged on the upper side with respect to the first arm and connected to the first arm, and the substrate-handling hand includes a first hand arranged on the upper side with respect to the second arm, and a second hand arranged on the upper side with respect to the first hand, the method comprising:

controlling the substrate-conveying robot system so that, when one of the first hand and the second hand enters a substrate storage for storing the substrate in conveyance of the substrate, another of the first hand and the second hand that is holding the substrate is moved to an avoidance position that is positioned on the upper side with respect to the second arm and overlaps the second arm; and acquiring positional information on a notch or an orientation flat in the substrate conveyed by the substrate-handling hand based on an image of the substrate that is captured from a lower side when the other of the first hand and the second hand is moved to the avoidance position in the conveyance of the substrate.

* * * * *